United States Patent [19]
Skogward et al.

[11] Patent Number: 5,791,196
[45] Date of Patent: Aug. 11, 1998

[54] SHIFTING APPARATUS FOR CONTROL OF A GEARBOX

[75] Inventors: Kenneth Skogward, Huskvarna; Klaus Timmann, Jonkoping, both of Sweden

[73] Assignee: Scandmec AB, Sweden

[21] Appl. No.: 605,188

[22] PCT Filed: Nov. 14, 1994

[86] PCT No.: PCT/SE94/01068

§ 371 Date: Jul. 1, 1996

§ 102(e) Date: Jul. 1, 1996

[87] PCT Pub. No.: WO95/13933

PCT Pub. Date: May 26, 1995

[30] Foreign Application Priority Data

Nov. 15, 1993 [SE] Sweden .................. 9303777
Nov. 15, 1993 [SE] Sweden .................. 9303778
Nov. 15, 1993 [SE] Sweden .................. 9303779

[51] Int. Cl.$^6$ .................. B60K 20/04; F16H 59/10
[52] U.S. Cl. .................. 74/483 R; 74/475; 74/538; 192/4 A
[58] Field of Search .................. 74/475, 483 R, 74/538; 192/4 A

[56] References Cited

U.S. PATENT DOCUMENTS 2,527,774  10/1950  Stieger ................... 74/538
4,054,181  10/1977  Grosseau .
4,365,522  12/1982  Kubota et al. .
4,641,545  2/1987  Rabe ........................... 74/538
4,934,496  6/1990  Barske et al. ............. 74/483 R
5,150,593  9/1992  Kobayashi ................. 74/538

FOREIGN PATENT DOCUMENTS 437150  7/1991  European Pat. Off. .
7501152  1/1975  France .
1486114  9/1977  United Kingdom .

*Primary Examiner*—Charles A. Marmor
*Assistant Examiner*—David M. Fenstermacher
*Attorney, Agent, or Firm*—Lerner, David, Littenberg, Krumholz & Mentlik

[57] ABSTRACT

Shifting arrangement for a gearbox, having a shifter lever, a shifter bracket in which the lever is pivotally attached for movement between a number of shifting positions, and a releasable shifter latch for releasable blocking of the lever against an unintentional movement to certain shifting positions, whereby the shifter latch presents a first latch portion belonging to the lever and a second latch portion belonging to the bracket. The bracket is formed as two separate bracket portions of which one portion supports said latch portion belonging to the bracket and further defines the pivot axis of the shifter lever and has at least one attachment means for attaching the bracket portion to a base in a determined position, and the other bracket has a pivot bracket through which the shifter lever is pivotally attached to the base in a determined position relative to the first bracket portion.

29 Claims, 8 Drawing Sheets

SHIFTING APPARATUS FOR CONTROL OF A GEARBOX

FIELD OF THE INVENTION

The present invention relates to a shift lever and mounting bracket for control of an automatic gearbox in a motor vehicle.

BACKGROUND OF THE INVENTION

An example of a shifting arrangement is the gear control for automatic gearboxes in motor vehicles. A gear control is generally provided with a control lever, which is pivotally anchored into a control bracket. The gear control must be anchored into a fixed part of the vehicle to provide a high degree of stability and also a well defined positioning with minimizing of tolerances. Known gear control is provided with e.g. a three-dimensionally formed bracket of injection moulded plastic, which gives rise to high tooling costs. In an alternative known solution, the bracket is made in form-pressed sheet which implies a great deal of welding and fitting work as well as high tooling costs.

There is therefore a need for a shifting apparatus which can be anchored with a good stability and well defined positioning.

SUMMARY OF THE INVENTION

According to the present invention, these and other objects have now been achieved by the invention of a shifting apparatus to be mounted on a base for control an automatic gearbox, which comprises a shifter bracket with first and second bracket members that are separately and independently mountable to the base, a shifter lever that is pivotally attached to the shifter bracket for movement between a plurality of shifting positions, and a releasable shifter latch for releasably blocking the lever against unintentional movement to certain of the shifting positions. The shifter latch comprises a first latch portion attached to the shifter lever and a second latch portion depending from the first bracket member. The first bracket member defines a pivot axis of the shifter lever, and has a first attachment means for attaching the first bracket member to the base. The second bracket member pivotally anchors the shifter lever to the base for pivoting about the defined pivot axis. The second bracket member further has a second attachment means for attachment of the second bracket member to the base.

In accordance with one embodiment of the apparatus of the present invention, the shifting apparatus further has a pivot shaft that attaches the shifter lever to the second bracket member, connecting the first and second bracket members. In this embodiment, the first bracket member is directly attached to the base by the first attachment means, and is additionally attached to the base through the second bracket member.

The pivot shaft may have a center portion and two end portions. In that case, the first bracket member is connected to the center portion and the second bracket member is connected to both end portions.

In another embodiment of the invention, the second bracket member has a dimension in a direction parallel to the pivot axis, exceeding the dimension of the first bracket member in that parallel direction.

In another embodiment of the invention, the first attachment means comprises a single attachment point for attachment directly to the base. The second attachments means may comprise at least two attachment points for attachment directly to the base.

The first latch portion may be moveable between a blocking position and a free position, while the second latch portion depends from one of the first and second sides of the first bracket member. The first latch portion may be adapted for cooperation with the second latch portion depending from the first side and with the second latch portion depending from the second side.

In accordance with one embodiment of the apparatus, the first latch portion comprises two couplings, one of the couplings being attached to a release mechanism in the shifter lever for releasing the shifter latch. In that embodiment, the first latch portion may comprise first and second legs, each leg extending in a respective one of the sides of the first bracket member. The apparatus may further comprise an indexing mechanism for defining and shifting positions, the indexing mechanism including a moveable portion and tracks on a side of the first bracket member opposite from the side from which the second latch portion depends. In that case, the first leg of the first latch portion forms a latch part and the second leg supports the moveable portion of the indexing mechanism.

In accordance with one embodiment of the apparatus of the present invention, the shifting apparatus may have an electrically activatable release lock for releasably locking the first latch portion. The electrically activatable release lock includes a moveable block for cooperation with the first latch portion for selectively locking the first latch portion.

In accordance with one embodiment of the apparatus of the present invention, the shifter lever defines a hollow space extending transversely through the shifter lever. The first bracket member comprises an arched portion extending through the hollow space. In that embodiment, the second latch portion may depend from the arched portion of the first bracket member.

In accordance with another embodiment of the apparatus of the present invention, the first bracket member comprises an arched portion having a first end, and the attachment means depends from the first end. In that embodiment, the arched portion may further have a second end spaced away from the base.

In accordance with another embodiment of the apparatus of the present invention, the first bracket member is an extruded profile.

BRIEF DESCRIPTION OF THE DRAWINGS

The invention will now be described in more detail in relation to various embodiments and with reference to the accompanying drawings, in which.

Figure 1:
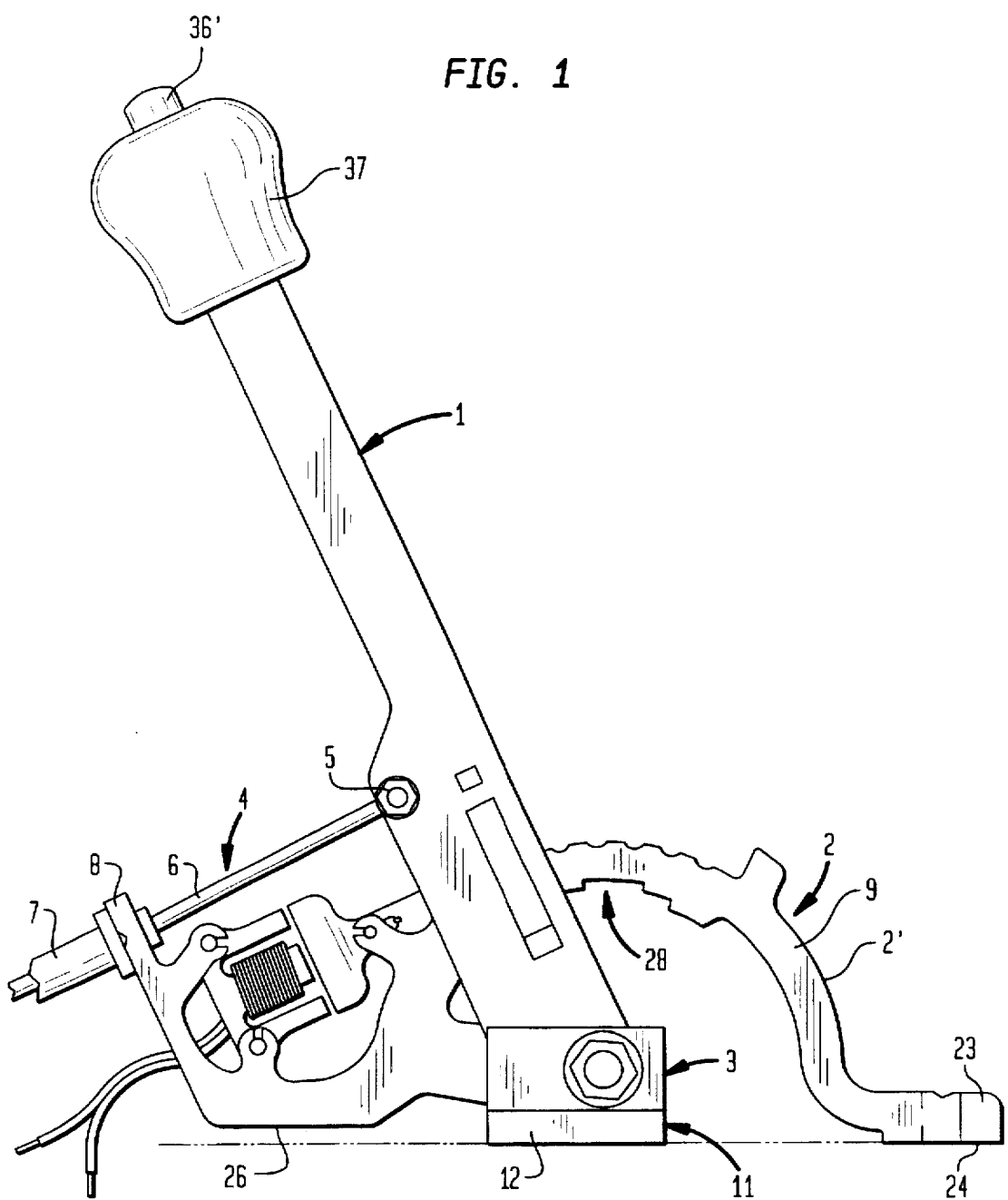
FIG. 1 is a side view of a shifting arrangement according to the invention in the form of a gear control as viewed from the left-hand side in a vehicle.

DETAILED DESCRIPTION OF THE PREFERRED EMBODIMENTS:

The shifter arrangement described herein is a gear control of an automatic gearbox in a motor vehicle. Referring to the drawings, in which like reference numerals refer to like elements thereof, the shifting arrangement comprises two main parts, namely a shifter lever 1 and a shifter bracket 2, see for example FIGS. 1 and 2. The shifter lever 1 is pivotally attached to the shifter bracket 2 through a pivot joint 3, whereby the pivot axis of the shifter lever is defined relative to the shifter bracket. A transmission 4 is coupled to the shifter lever at an attachment point 5 positioned at a distance from the pivot joint 3, whereby the pivoting movement of the manoeuvring lever 1 is transposed into a reciprocal longitudinal movement of the transmission 4. In the shown example, the transmission is a wire 6, having a casing 7 which is fixed to a flange 8 of the shifter bracket 2. In another embodiment, the transmission comprises a link system where, instead, a link arm is fixed to a corresponding attachment point 5 in the lever. In this way no attachment for the transmission in the form of a flange 8 is required.

The shifter bracket 2 basically consists of an arched bracket 2' which is manufactured as an extruded profile of, for example, metal, such as aluminum or an alloy thereof. By extrusion the profile can be provided with a plurality of functions at a relatively low cost by choice of the profile shape. The arched bracket 2' is prepared by cutting the continually produced profile in straight cut sections so that two planar, substantially parallel sides 9, 10 are obtained.

Figure 4:
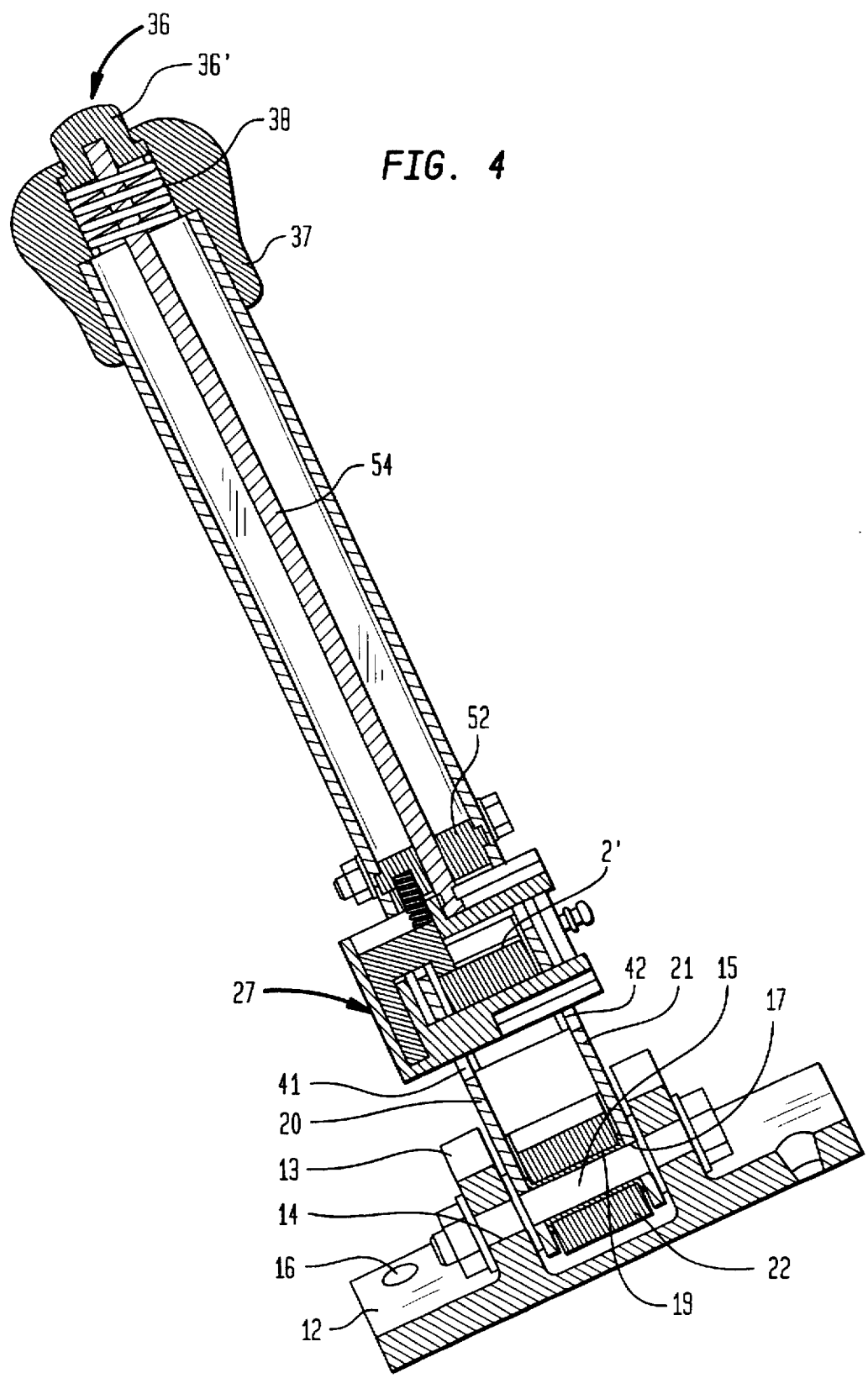
FIG. 4 is a sectional view through the gear control, along line IV—IV in FIG. 3.

A separate pivot bracket 11 is also included in the shifter bracket 2, for the pivotal attachment of the shifter lever to a base, for example a fixed piece of the vehicle. The pivot bracket 11, as shown for example in FIGS. 1 and 4, is similarly advantageously produced as an extruded profile and comprises two fastening flanges 12 and two bearing supports 13, each with its own through hole 14, through which extends a pivot shaft 15 in the form of a nut and bolt. The pivot bracket 11 can, in certain applications, advantageously even be manufactured from sheet metal. The fastening flanges 12 are provided with through-holes 16 for receiving fastening screws (not shown). As is clear from FIG. 4 the pivot shaft also extends through two through-holes 17 in the manoeuvring lever 1 which, in the shown example, is formed as a tube with a round or rectangular cross section.

Figure 3:
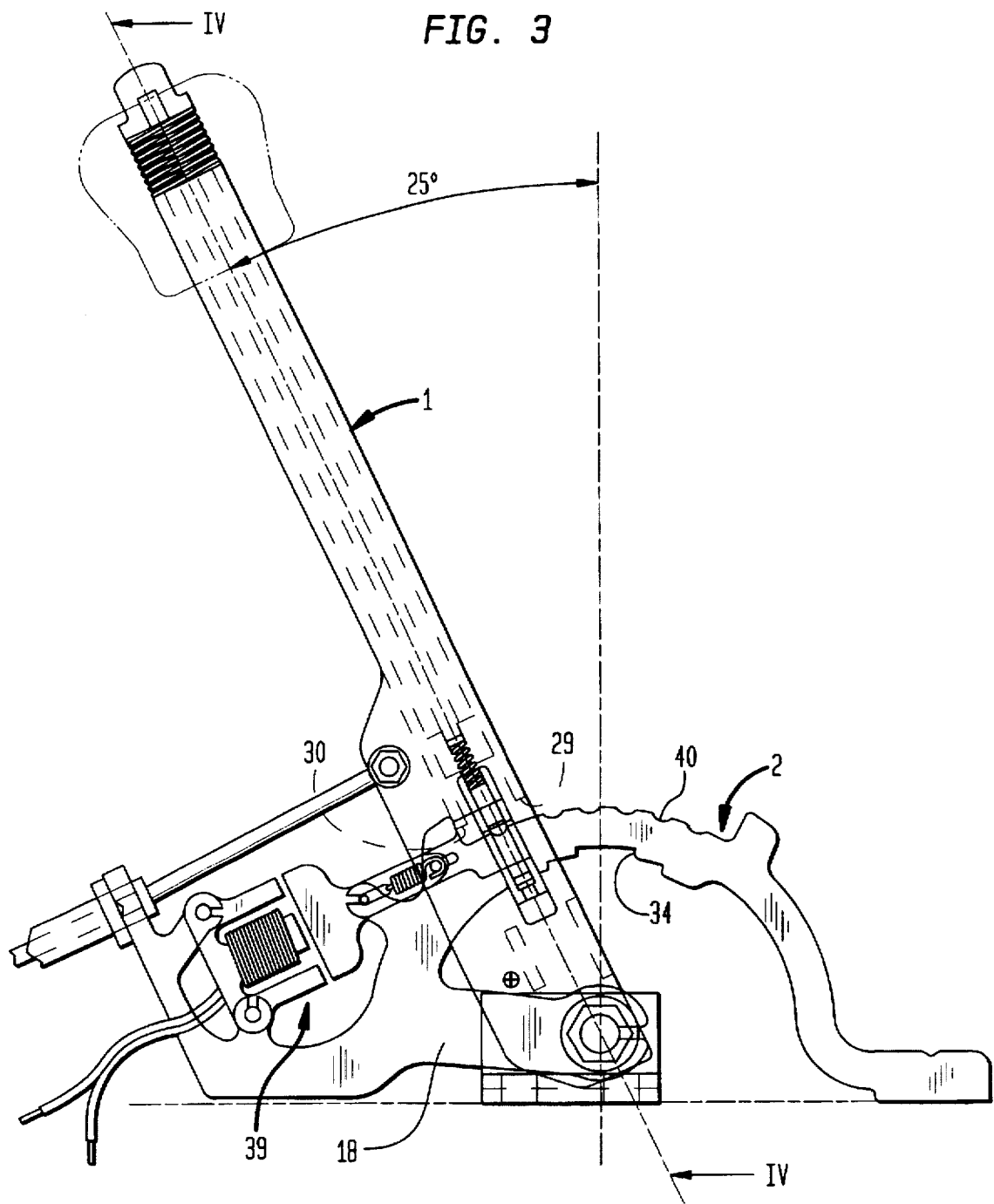
FIG. 3 is a side view of the gear control, in the park position.

As is clearest from FIG. 3, the position of the pivotal joint 3 of the shifter lever 1 relative to the shifter bracket 2 is determined by means of an arm 18 formed in the profile, said arm having an through-hole 19, through which the pivot shaft 15 extends and is positioned with well-defined tolerance to establish the position of the pivotal center of the shifter lever relative to the shifter bracket 2. The sideways position along the pivotal shaft 15 is also defined by the opposed walls 20, 21 of the manoeuvring lever 1 projecting downwardly on respective sides of the arm 18. In the shown example, two flanged bearing sleeves 22 are provided, said bearing sleeves 22 being of a material with good wear resistance and low friction, which additionally ensures a well-defined, playfree pivot for the manoeuvring lever.

By means of its profile shape, the arched bracket 2' is formed with a fastening portion 23 in the form of a flange which is provided with a through-hole for accepting a screw (not shown). The fastening portion presents a support surface 24 on its lower side, said support surface being planar for contact against a planar surface of a fixed part of the vehicle. A groove 25 is formed in the profile for defining the center of the through-hole, whereby the positioning in the vehicle can be defined with great precision.

Due to the above-described construction of the shifter bracket 2 with two bracket parts, i.e. the arched bracket 2' and the pivot bracket 11, the arched bracket 2' can be produced with a limited, space-saving width, which in the shown example is less than the width of the shifter lever 1, which in the example as shown is arranged as a tube having for example round or squared cross section, and still achieve a steady fixation of the shifter lever as well as the shifter bracket. This is achieved by providing the gear control with a three-point mounting with triangularly orientated fastening points, whereby the fastening portion 23 of the arched bracket forms a symmetrically-centrally placed attachment point, while both of the attachment points 16 of the pivot bracket are displaced sideways on respective sides of an imaginary symmetrically-centrally vertical plane through the arched bracket 2', at right angles to the pivot shaft 15. The arched bracket 2' is thus supported directly on the base with only one attachment point, while other contact with the base occurs via the pivot bracket. A distinct space 26 is thus maintained from the base at one end of the arched bracket 2', whereby play and vibrational noise is avoided.

The gear control is arranged, in a manner known in the art, to determine the different gear positions of the automatic gearbox by selection of the pivotal location of the shifter lever 1, and by actuation of the automatic gearbox via the transmission 4. In the shown example, the gear control is arranged in a standard manner to adopt six different gear positions, namely park position, reverse position, neutral position, normal drive position and two special drive positions third gear and low. According to present standards, the gear control is provided with releasable shifter latch in order to prevent unintentional shifting from certain gear positions to certain other gear positions, both for reasons of safety and in order to protect the gearbox. The shifter latch comprises a first latch portion 27 belonging to the shifter lever and a second latch portion 28 belonging to the shifter bracket. The shifter lever 1 is, in the shown example, as most clearly seen from FIGS. 3 and 4, provided with a continuous hollow space extending transverse to the longitudinal direction of the shifter lever, formed by two openings 29, 30 in the lever facing each other and being positioned in the wall of the tubular shifter lever. The arched bracket 2' is additionally arranged to extend through said hollow space in the shifter lever which is movable over an angular sector between two end positions so that the various gear positions of the gear control are covered. The first latch portion 27 belonging to the shifter lever 1 is formed by a unit in the shifter lever which is movable by the driver, said unit being arranged to cooperate with the other fixedly attached latch portion 28 in the shifter bracket 2 and, depending on the shift position and the form of the latch part 28, to permit and to block shift movements of the lever 1. The construction of the movable latch portion 27 will be described in more detail below.

The latch portion 28 belonging to the shifter bracket 2 is formed simply by virtue of the fact that the arched bracket 2', over the part which lies within the movement sector of the shifter lever, is profiled during extrusion with plurality of radially extending latching edges 31, 32, 33, 34 and 35.

These are so arranged that, as standard, the shifter lever 1 is blocked against movements in certain directions; i.e., from certain latched positions to certain other latched positions, but permits movement in the opposite direction. However, complete latching is present in the park position. The latching can, however, be released by means of a release mechanism 36 in the form of a push-button 36' arranged on the gear lever knob 37 and which is biased into an end position by means of a spring 38, by means of which push-button the latch part 27 is movable. The shifter latch is, however, locked in the park position under certain conditions by means of an adjustable lock 39, the construction of which will be described in more detail below. By means of the adjustable lock 39, movement out of the park position can for example be prevented if the vehicle's hand or foot brake are not activated and the ignition key is not in the ignition position, which is a factor giving rise to increased safety.

In certain applications the gear control 1 is additionally provided with a position indexing system which ensures that the gear lever distinctly adopts and maintains chosen gear positions. This function is also achieved by profiling the shifter bracket with a number of tracks 40, one track for each gear position, while an indexing mechanism in the form of a spring-biased element is arranged in the gear lever, said element being arranged to project into the respective track and maintain the gear lever in the chosen position. The tracks are formed to act together with the spring-biased element so that they do not produce any blocking against movement between the various gear positions. The spring-biased element is arranged in the example shown in a manner which will be described in more detail below.

The latching portion 27 of the shifter latch which belongs to the shifter lever 1 forms, together with the indexing mechanism, a combined unit with a construction which is best shown in FIGS. 4, 6, 7, 8 and 9. The latch portion 27 comprises a latch hook element which is guided and moveable in tracks 41, 42 in the shifter lever, said latch hook element having two legs 43, 44 and a transverse piece 45. In the example shown the latch hook element is U-shaped but can alternatively be rectangular or of a different form wherein two legs are fixedly connected to each other. The legs 43,44 form between them a space 45' into which the shifter bracket projects. At least the inwardly facing edge 46 of one of the legs 44 forms a latching edge for cooperation with the latching part 28 of the shifter bracket 2; i.e., the fixed latching edges 31-35 which, in the first embodiment, are arranged on the lower side of the bracket. The mechanism 47 for positional indexing is integrated with the movable latch portion 27 in that the latch portion is provided with a recess 48. An indexing element 49 is movable in this recess so that a pin 50 is urged against the arched bracket 2' by the action of a spring 51, on the side of the arched bracket where the index track 40 is arranged; i.e., on the upper side of the shifter bracket 2 in the first embodiment. The spring 51 is constrained between a piece 52 fixedly arranged in the shifter lever, said piece being provided with a continuous channel 53 through which the shifter rod 54 extends and is movable. The latch hook element 27 is biased by the spring 38 through the rod 54 so as to have its latching edge 46 in contact with the shifter bracket 2, with a force which extends in the longitudinal direction of the shifter lever.

The shifter rod 54 is, in the shown example, provided at its lower end with a neck portion 55. The latch hook element 27 is formed with an open channel 56 formed transversely with a cross-section corresponding to that of the rod end and opening towards the free ends of the legs 43, 44, said channel 56 being formed in both legs 43, 44 so that when mounting the shifter rod end with a sideways movement (see the arrow 57), the rod end can be introduced into the channel and maintained there under the action of a spring-biased tongue 58. In this way the latch portion 27 can be turned so that the shifter rod 54 can be fixed to either of the two legs 43, 44, whereby the same latch portion can be used for two different types of gear control. As an alternative to the embodiment shown in FIGS. 1-6 with the positional indexing on the upper side and the latch part 28 on the lower side of the bracket, the latch part can be arranged on the upper side of the arched bracket, with the positional indexing; i.e. the track 40, arranged on the lower side of the bracket as shown in the alternative embodiment in FIG. 10.

As shown in FIGS. 3 and 4, the movable latch part 27 is in an upper position when the shifter lever 2 is in the park position, whereby the release button 36' is in an outer position. Corresponding latch part and release button positions are also adopted in the neutral and drive positions, while in the reverse and low positions the release mechanism and thereby also the latch portion 27 are made to adopt an intermediate position (not shown) by pressing in the button 36'. In order to leave the park position and to take up the special driving position low, the button 36' has to be pressed in completely, whereby the latch portion 27 is made to adopt the lower position shown in FIGS. 5 and 6.

Figure 10:
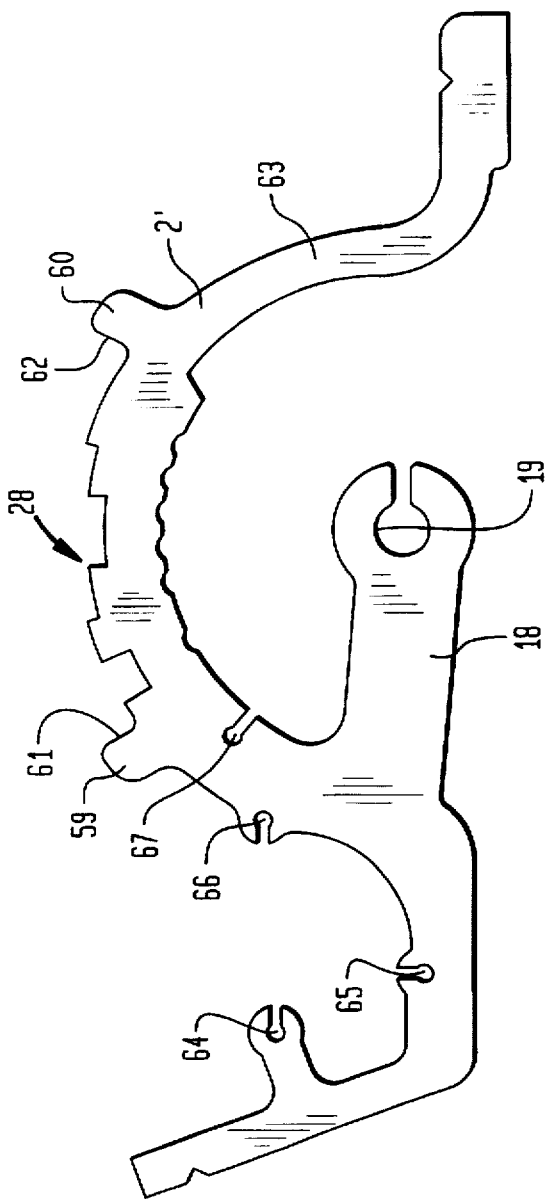

FIG. 10 shows the arched bracket 2' in an alternative embodiment with the latch portion 28 on the upper side of the profile and the index track 40 on the lower side. Two upright portions 59, 60 form abutment surfaces 61, 62 which face each other and define end positions for the shifter lever 1 by abutment against these walls above both openings 29, 30 of the lever. Additionally, the basic shape of the profile is a central, substantially semi-circular arch-shaped portion 63, of which the segment between the abutment portions 59, 60 presents the latch portion 28 of the manoeuvring bracket 2 on the one side of the profile. The index track over the same segment is arranged on the opposite side of the profile. In the embodiment shown in FIG. 10 with the latch portion 28 arranged on the upper side, the release mechanism 36 and therewith also the movable latch portion 27 are spring-biased in a direction downwardly towards the shifter bracket 2. The release button 36' is formed for a lifting movement in order to lift the latch portion past the actual latching edges. Irrespective of whether the latch portion 28 is arranged on the upper or the lower side of the manoeuvring bracket 2, the track 40 for positional indexing may alternatively be completely omitted or arranged in another way. FIG. 10 also shows four fastening holes 64, 65, 66, 67 for the releasable lock 39.

Figure 11:
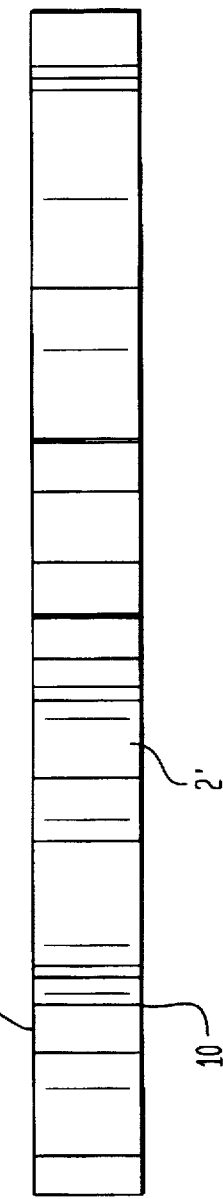

From FIG. 11 it is clear that the shifter bracket 2 consists of a profile which is cut transversely to the profile direction to form two planar, mutually parallel side surfaces 9, 10. Practically all the functions of the bracket are thus achieved by a particular form of the profile. The side surfaces 9, 10, however, have a function as abutment surfaces for the manoeuvring lever upon heavy sideways lever loading and also as a fastening surface for the release lock 39.

Figure 2:
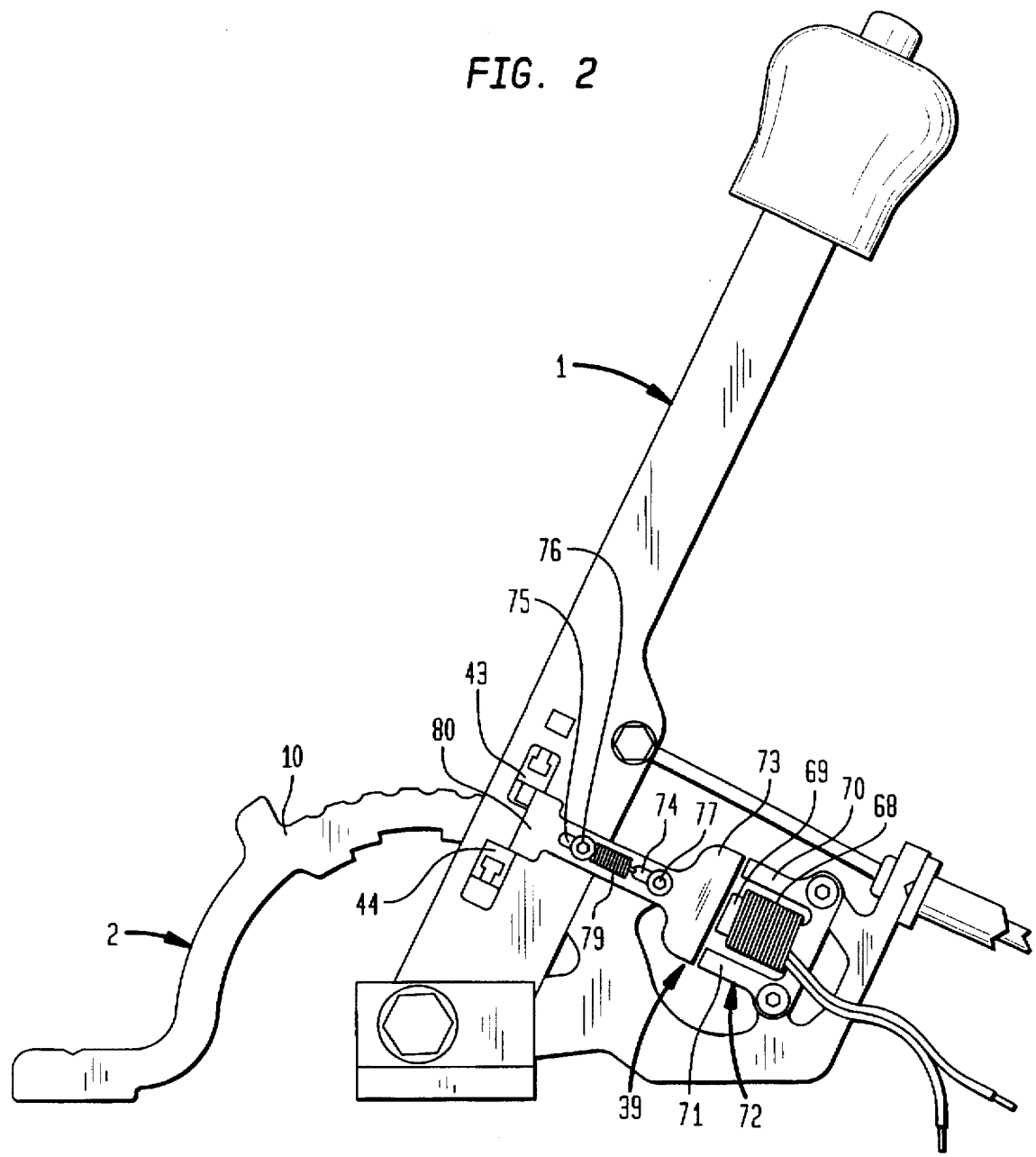
FIG. 2 is a side view of the gear control, viewed from the right-hand side.
Figure 5:
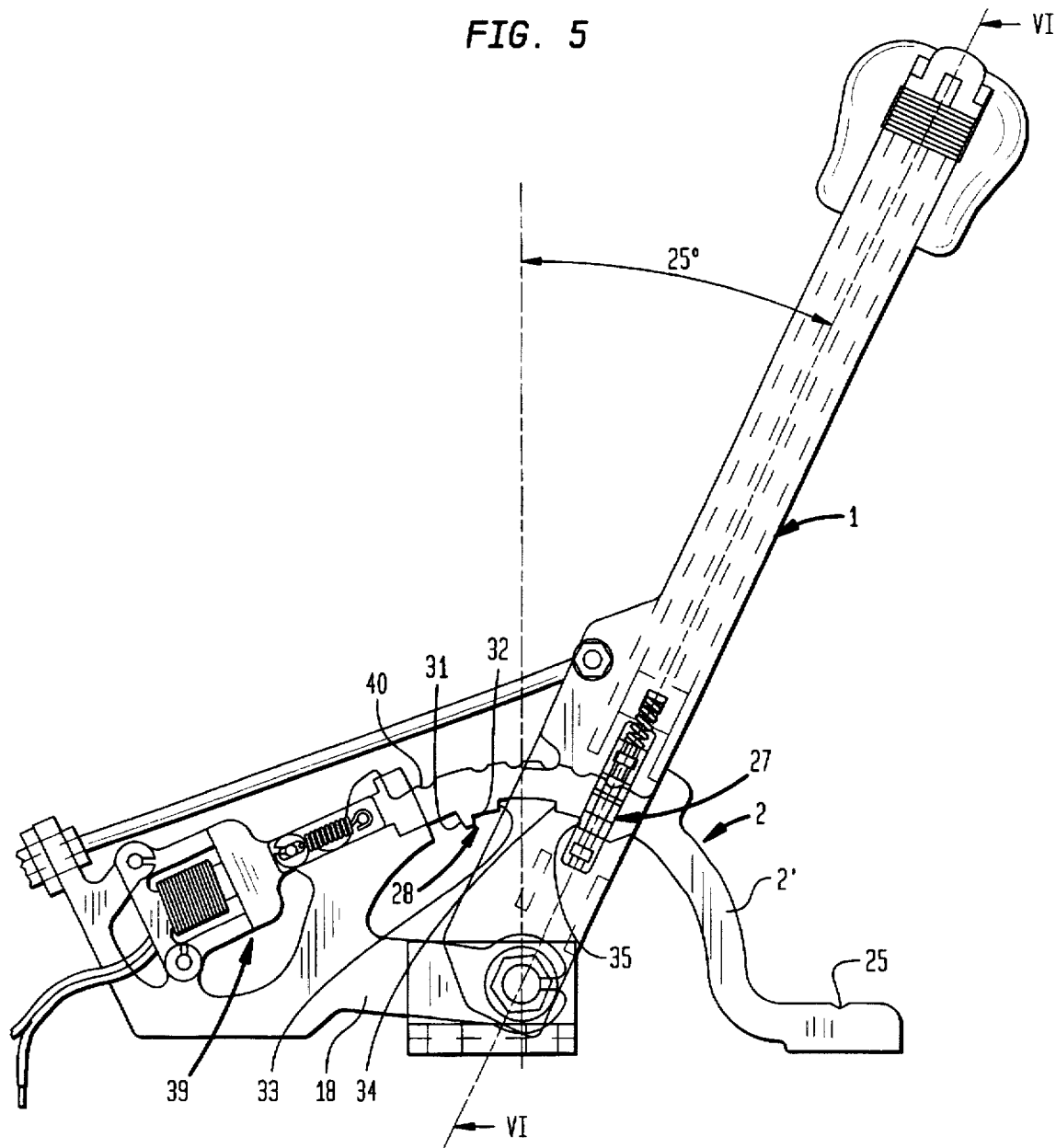
FIG. 5 is a side view of the gear control in another gear position.
Figure 6:
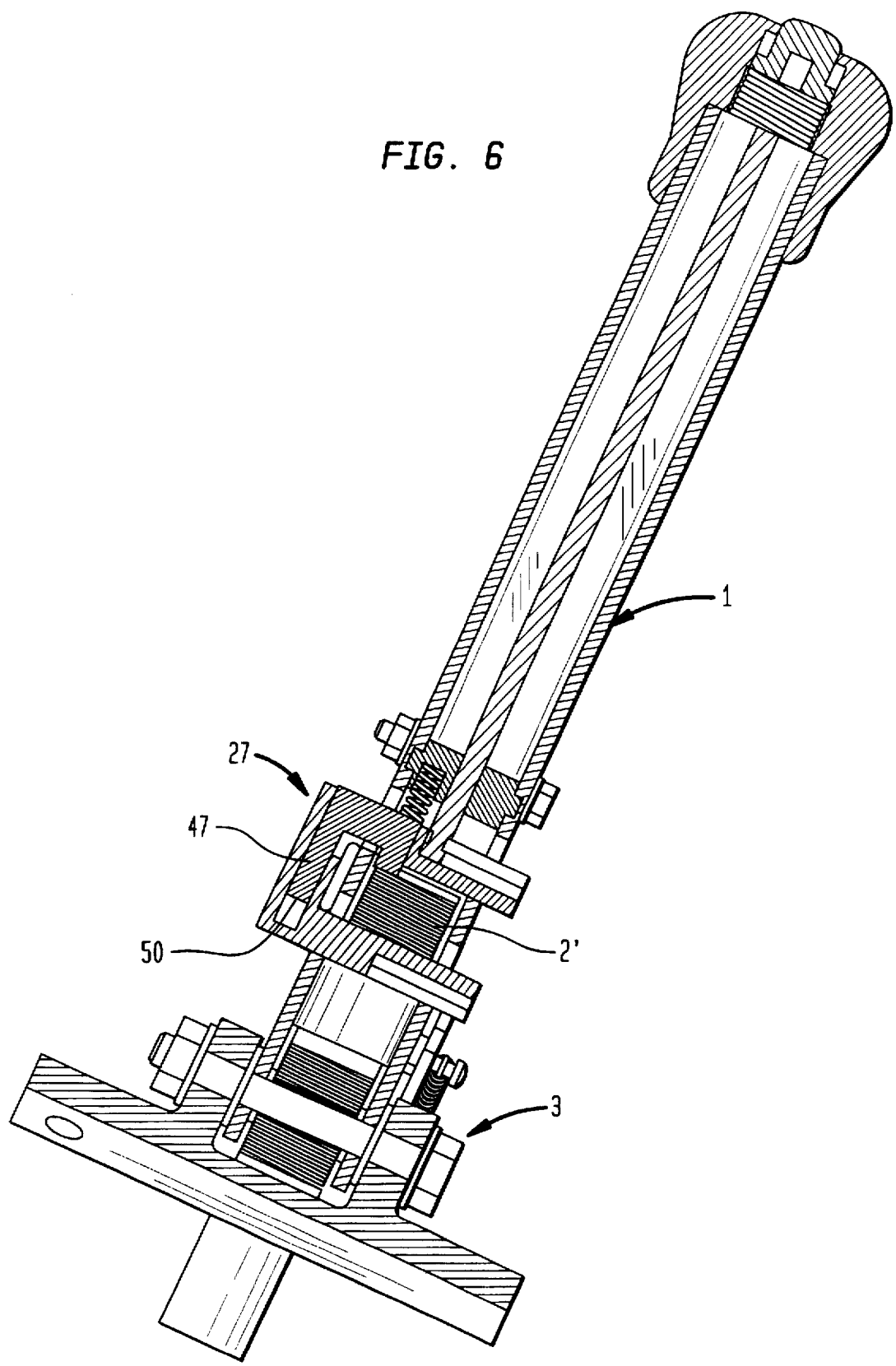
FIG. 6 is a sectional view through the gear control along line VI—VI in FIG. 5.
Figure 7:
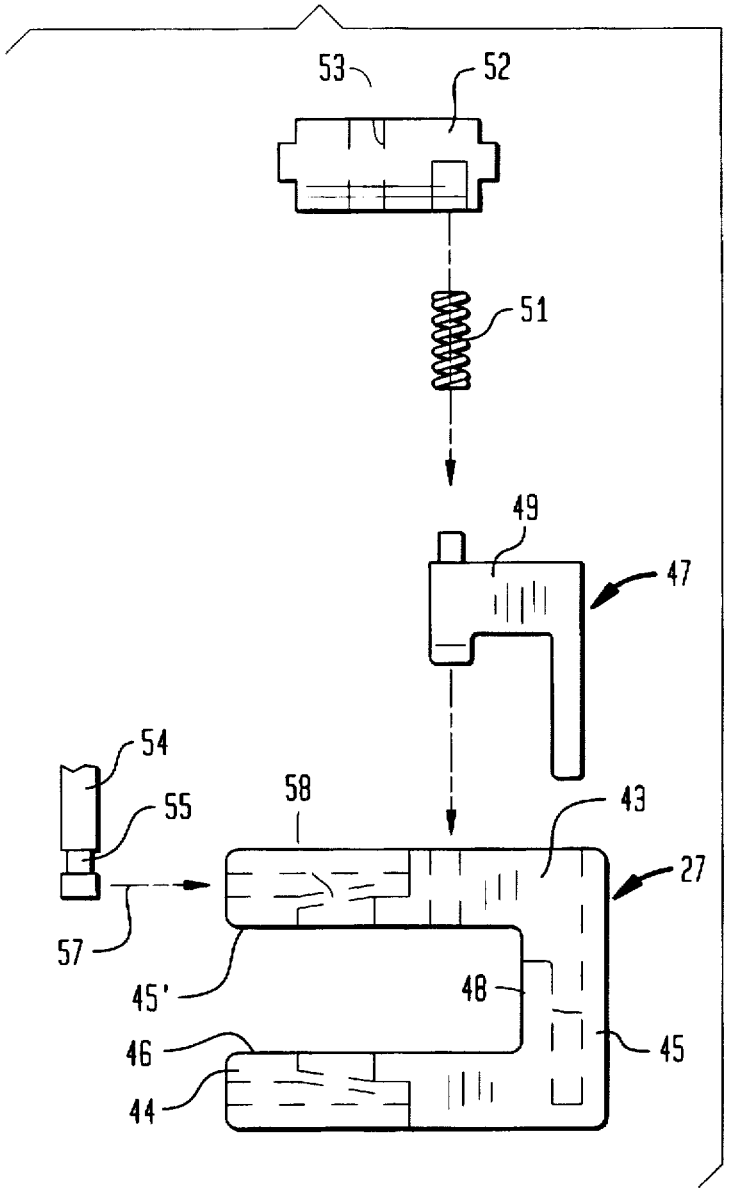
FIG. 7 is an exploded plan view of a first latch portion of the shifter latch of the gear control.
Figure 8:
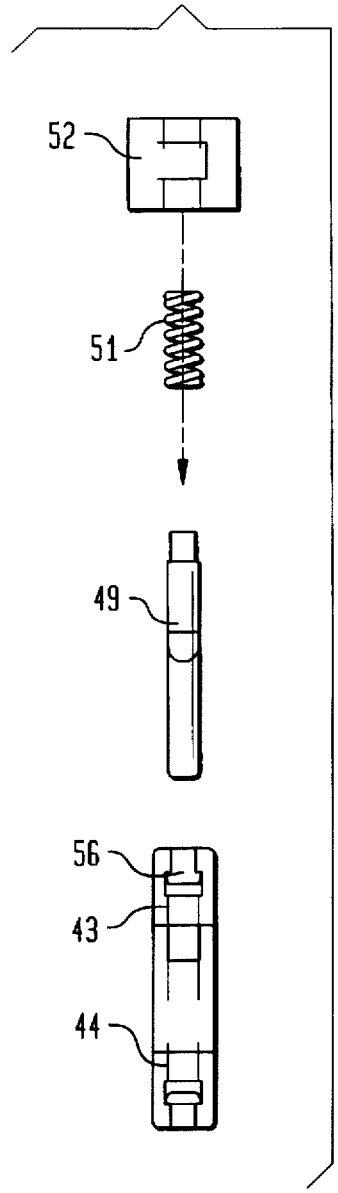
FIG. 8 is an exploded side view of the first latch portion of FIG. 7.
Figure 9:
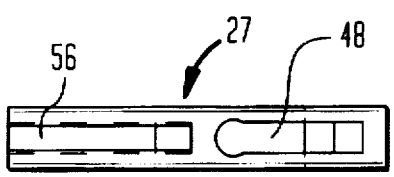
FIG. 9 is an end view of the first latch portion of FIG. 7, and FIGS. 10 & 11 are a side view and a plan view respectively of an alternative embodiment, of a shift bracket included in the gear control.

The construction of the release lock 39 is best seen from FIGS. 2, 3 and 5, to which reference is made in the following. The release lock comprises an electromagnet with a coil 68 wound on a middle leg 69 of a stamped, fixed piece of sheet 72 of magnetisable material provided with three legs 69, 70, 71. The piece of sheet 72 is fixedly screwed to fastening holes 64, 65 in the arched bracket 2'. The release lock 39 further comprises a movable piece of sheet 73, positioned in the same plane as the fixed piece of sheet, said moveable piece of sheet 73 being of a magnetisable material. This is provided with two elongated holes, 74, 75, through which two screws 76, 77 are fastened in fastening holes 66, 67 in the arched bracket 2'. A distance plate (friction plate) (not shown) is attached inside the movable piece of sheet for guiding it. By means of a tension spring 79 fixed between the hole 74 and the screw 76, the movable piece of sheet 73 is urged toward a forward latching position. In this position a locking portion 80 (see also FIG. 4) of the movable piece of sheet projects between the two legs of the latch part 27 when the shifter lever 1 is in the park position and maintains the latch lever locked in the park position. The latch can therefore not be released with the release mechanism 36. When a voltage is applied to the coil of the electromagnet; i.e., when the vehicle's foot or handbrake is applied and the ignition lock is in the ignition position, the movable piece of sheet is attracted towards the electromagnet, by means of which the locking part 80 is moved out of the way and the latch part 27 can be released by pressing down the release button so that the latching edge 46 of the latch part 27 is moved to a position below the fixed latching edge 31 on the latching part 28. In the shown example the movable piece of sheet 73 extends outside the lever 1 as does the latch part 27 with both its legs 43, 44.

To summarize, the present invention involves a multiple point anchoring of the shifter device and consequently the shifter lever by the fact that the shifter bracket consists of two separate bracket members, one of the bracket members carrying the shifter latch and part of the pivot joint for the lever and at least one attachment point. The other bracket member forms a pivot bracket for the lever with at least two attachment points, said pivot bracket being connected to the first bracket member over the pivot shaft of the lever, each attachment point being provided to be attached to a base, possibly over a common attachment plate and together positioning the pivot shaft for the shifter lever.

The first bracket member, namely the arched bracket 2', takes up the forces acting on the lever in the longitudinal direction, that is to say along the normal plane of motion for the lever, and establishes the index positions of the lever. The second bracket member, namely the joint bracket 11, takes up the side forces acting on the lever, that is to say tendencies to movements transversely to said normal plane of motions. This is accomplished by the fact that pivot bracket 11 has an attachment member which has a larger dimension sidewardly, that is to say in the longitudinal direction of the pivot shaft 15, than the dimension sidewardly of the attachment member 23 of the arched bracket 2'. The arched bracket is connected to the pivot bracket over the pivot shaft and achieves indirectly an extra support against the base. The arched bracket therefore requires only a single attachment member which simplifies mounting and still results in a high degree of stability.

The invention is not limited to the embodiments as described above and in the drawings, but can be modified within the frame of the accompanying patent claims. For example, the attachment point for the arch bracket may be positioned on the other side of the pivot bracket, that is to say that the space is missing. In that case, the other attachment member 23 may be deleted as a whole and the arch may end at the end stop 60. The attachment member 23 can however be kept in order to give increased stability. The arch bracket 2' as well as the pivot bracket may be formed and produced in a different way, for example, they may be manufactured in plastics or sheet metal.

We claim:

1. A shifting apparatus to be mounted on a base for control of an automatic gear box, comprising:

a shifter bracket comprising first and second bracket members separately mountable to the base in separate positions relative to one another;

a shifter lever attached to said shifter bracket for pivoting about a pivot axis between a plurality of shifting positions;

a releasable shifter latch for releasably blocking said lever against an unintentional movement to certain shifting positions, said shifter latch comprising a first latch portion attached to the shifter lever and a second latch portion depending from said first bracket member; and a pivot shaft extending along said pivot axis and connecting said shifter lever, said first bracket member and said second bracket member, said pivot shaft comprising a center portion and two end portions, wherein one of said bracket members is connected to said center portion and the other of said bracket members is connected to both said end portions;

whereby said respective positions of said first and second bracket members relative to one another are established by said connecting of said bracket members to said pivot shaft to substantially preclude misalignment between said bracket members.

2. A shifting apparatus as claimed in claim 1, wherein said second bracket member has a dimension in a direction parallel to said pivot axis exceeding a dimension of said first bracket member in said parallel direction.

3. A shifting apparatus as claimed in claim 1, wherein said first bracket member comprises a single attachment point for attachment directly to the base.

4. A shifting apparatus as claimed in claim 1, wherein said second bracket member comprises at least two attachment points for attachment directly to the base.

5. A shifting apparatus as claimed in claim 1, wherein said first latch portion is moveable between a blocking position and a free position; further wherein said second latch portion depends from one of first and second sides of said first bracket member, said first latch portion being adapted for cooperation with said second latch portion depending from said first side and with said second latch portion depending from said second side.

6. A shifting apparatus as claimed in claim 5, wherein the first latch portion comprises two couplings, one of said couplings being attached to a release mechanism in said shifter lever for releasing said shifter latch.

7. A shifting apparatus as claimed in claim 6, wherein said first latch portion comprises first and second legs, each said leg extending on a respective one of said sides of said first bracket member.

8. A shifting apparatus as claimed in claim 7, further comprising an indexing mechanism for defining said shifting positions, said indexing mechanism including a moveable portion, and tracks on a side of said first bracket member opposite said side from which said second latch portion depends;

wherein said first leg of said first latch portion forms a latch part and said second leg supports said movable portion of said indexing mechanism.

9. A shifting apparatus as claimed in claim 5, further comprising an electrically activatable release lock for releasably locking said first latch portion, said electrically activatable release lock including a movable lock for cooperation with said first latch portion for selectively locking said first latch portion.

10. A shifting apparatus as claimed in claim 1, wherein said shifter lever defines a hollow space extending transversely through said shifter lever, and said first bracket member further comprises an arched portion extending through said hollow space.

11. A shifting apparatus as claimed in claim 10, wherein said second latch portion depends from said arched portion of said first bracket member.

12. A shifting apparatus as claimed in claim 1, wherein said first bracket member further comprises an arched portion having a first end, said first bracket member being mounted to said base at said first end.

13. A shifting apparatus as claimed in claim 12, said arched portion further having a second end spaced away from the base.

14. A shifting apparatus as claimed in claim 1, wherein said first bracket member is an extruded profile.

15. A shifting apparatus to be mounted on a base for control of an automatic gear box, comprising:
- a shifter bracket comprising first and second bracket members separately and independently mountable to the base;
- a shifter lever pivotally attached to said shifter bracket for movement between a plurality of shifting positions, said shifter lever defining a hollow space which extends transversely through said shifter lever; and
- a releasable shifter latch for releasably blocking said lever against an unintentional movement to certain shifting positions, said shifter latch comprising a first latch portion attached to the shifter lever and a second latch portion depending from said first bracket member;
- said first bracket member defining a pivot axis of said shifter lever and having first attachment means for attachment of said first bracket member to the base, said first bracket member further comprising an arched portion extending through said hollow space in said shifter lever; and
- said second bracket member pivotally anchoring said shifter lever to the base for pivoting about said defined pivot axis, said second bracket member having second attachment means for attachment of said second bracket member to the base.

16. A shifting apparatus as claimed in claim 15, further comprising a pivot shaft, said pivot shaft attaching said shifter lever to said second bracket member, and connecting said first and second bracket members, whereby said first bracket member is directly attached to the base by said first attachment means and is additionally attached to the base through said second bracket member.

17. A shifting apparatus as claimed in claim 16, wherein said pivot shaft comprises a center portion and two end portions, and further wherein said first bracket member is connected to said center portion and said second bracket member is connected to both said end portions.

18. A shifting apparatus as claimed in claim 15, wherein said second bracket member has a dimension in a direction parallel to said pivot axis exceeding a dimension of said first bracket member in said parallel direction.

19. A shifting apparatus as claimed in claim 15, wherein said first attachment means comprises a single attachment point for attachment directly to the base.

20. A shifting apparatus as claimed in claim 15, wherein said second attachment means comprises at least two attachments points for attachment directly to the base.

21. A shifting apparatus as claimed in claim 15, wherein said first latch portion is moveable between a blocking position and a free position; further wherein said second latch portion depends from one of first and second sides of said first bracket member, said first latch portion being adapted for cooperation with said second latch portion depending from said first side and with said second latch portion depending from said second side.

22. A shifting apparatus as claimed in claim 21, wherein the first latch portion comprises two couplings, one of said couplings being attached to a release mechanism in said shifter lever for releasing said shifter latch.

23. A shifting apparatus as claimed in claim 22, wherein said first latch portion comprises first and second legs, each said leg extending on a respective one of said sides of said first bracket member.

24. A shifting apparatus as claimed in claim 23, further comprising an indexing mechanism for defining said shifting positions, said indexing mechanism including a moveable portion, and tracks on a side of said first bracket member opposite said side from which said second latch portion depends;
wherein said first leg of said first latch portion forms a latch part and said second leg supports said movable portion of said index mechanism.

25. A shifting apparatus as claimed in claim 21, further comprising an electrically activatable release lock for releasably locking said first latch portion, said electrically activatable release lock including a movable lock for cooperation with said first latch portion for selectively locking said first latch portion.

26. A shifting apparatus as claimed in claim 15, wherein said second latch portion depends from said arched portion of said first bracket member.

27. A shifting apparatus as claimed in claim 15, wherein said arched portion of said first bracket member has a first end, said attachment means depending from said first end.

28. A shifting apparatus as claimed in claim 27, said arched portion further having a second end spaced away from the base.

29. A shifting apparatus as claimed in claim 28, wherein said first bracket member is an extruded profile.

* * * * *

UNITED STATES PATENT AND TRADEMARK OFFICE
CERTIFICATE OF CORRECTION

PATENT NO. : 5,791,196

DATED : August 11, 1998

INVENTOR(S) : Kenneth Skogward and Klaus Timmann

It is certified that error appears in the above-identified patent and that said Letters Patent is hereby corrected as shown below:

Column 8, line 2, delete "separate" and insert therefor --respective--.
Column 10, line 34, delete "index" and insert therefor --indexing--.

Signed and Sealed this

Twenty-second Day of December, 1998

*Attest:*

BRUCE LEHMAN

*Attesting Officer*     *Commissioner of Patents and Trademarks*